(12) United States Patent
Grider et al.

(10) Patent No.: US 8,121,802 B2
(45) Date of Patent: Feb. 21, 2012

(54) SYSTEM AND METHOD FOR DETERMINING AN EXPECTED VEHICLE DRIVE RANGE

(75) Inventors: Duane M. Grider, Farmington Hills, MI (US); Bruce Carvell Blakemore, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/849,889

(22) Filed: Aug. 4, 2010

(65) Prior Publication Data

US 2011/0166810 A1    Jul. 7, 2011

(51) Int. Cl.
G01R 31/36    (2006.01)

(52) U.S. Cl. .......................................... 702/63

(58) Field of Classification Search ............... 702/60, 702/63, 68, 141, 142, 145–147, 149, 179, 702/193, 199; 700/291; 290/40 C
See application file for complete search history.

(56) References Cited

U.S. PATENT DOCUMENTS

| | | | |
|---|---|---|---|
| 5,426,589 A | | 6/1995 | Kitagawa et al. |
| 5,539,399 A | * | 7/1996 | Takahira et al. ......... 340/995.27 |
| 5,686,895 A | | 11/1997 | Nakai et al. |
| 6,160,380 A | | 12/2000 | Tsuji et al. |
| 2006/0276937 A1 | * | 12/2006 | Yamashita ................... 700/291 |

FOREIGN PATENT DOCUMENTS

JP    2001119802 A    4/2001

OTHER PUBLICATIONS

Andrew Kallfelz, Battery Monitoring Considerations for Hybrid Vehicles and Other Battery Systems With Dynamic Duty Loads, Battery Power Products & Technology, May/Jun. 2006, www.BatteryPowerOnline.com, vol. 10, Issue 3, 3 pgs.

* cited by examiner

Primary Examiner — Mohamed Charioui
(74) Attorney, Agent, or Firm — David B. Kelley; Brooks Kushman P.C.

(57) ABSTRACT

A vehicle may include one or more controllers configured to determine a remaining energy of the vehicle's battery, to determine a series of energy consumption rates of the vehicle, and to select a set of energy consumption rates from the series. The one or more controllers may be further configured to determine an expected drive range for the vehicle based on the remaining energy and the selected set of energy consumption rates.

11 Claims, 2 Drawing Sheets

SYSTEM AND METHOD FOR DETERMINING AN EXPECTED VEHICLE DRIVE RANGE

BACKGROUND

A battery electric vehicle (BEV) may be caused to move by operation of an electric machine. The electric machine may receive electrical power from an on-board battery. The battery may be charged with electrical power from a utility grid or other off-board power source.

BEV drivers may wish to know their distance to empty/expected vehicle drive range.

SUMMARY

A vehicle may include an electric machine, battery and one or more controllers. The one or more controllers may be configured to determine a remaining energy of the battery, determine a series of energy consumption rates of the vehicle, select a set of energy consumption rates from the series, and determine an expected drive range for the vehicle based on the remaining energy and the selected set of energy consumption rates.

A vehicle may include an electric machine configured to generate motive power for the vehicle, a battery configured to store energy for the electric machine, and one or more controllers. The one or more controllers may be configured to determine a remaining energy of the battery, determine a series of energy consumption rates for the vehicle, and determine whether at least one of the series of energy consumption rates differs from an average of the series of energy consumption rates by a predetermined amount. The one or more controllers may be further configured to determine an expected vehicle drive range based on the remaining energy and the at least one of the series of energy consumption rates if the at least one of the series of energy consumption rates differs from the average of the series of energy consumption rates by the predetermined amount.

A method for advising a driver of a vehicle may include determining a remaining energy of the vehicle's battery, determining a series of energy consumption rates of the vehicle, and selecting a set of energy consumption rates from the series. The method may further include determining an expected drive range for the vehicle based on the remaining energy and the selected set of energy consumption rates, and presenting the expected drive range to the driver via a driver interface.

DETAILED DESCRIPTION

Figure 1:
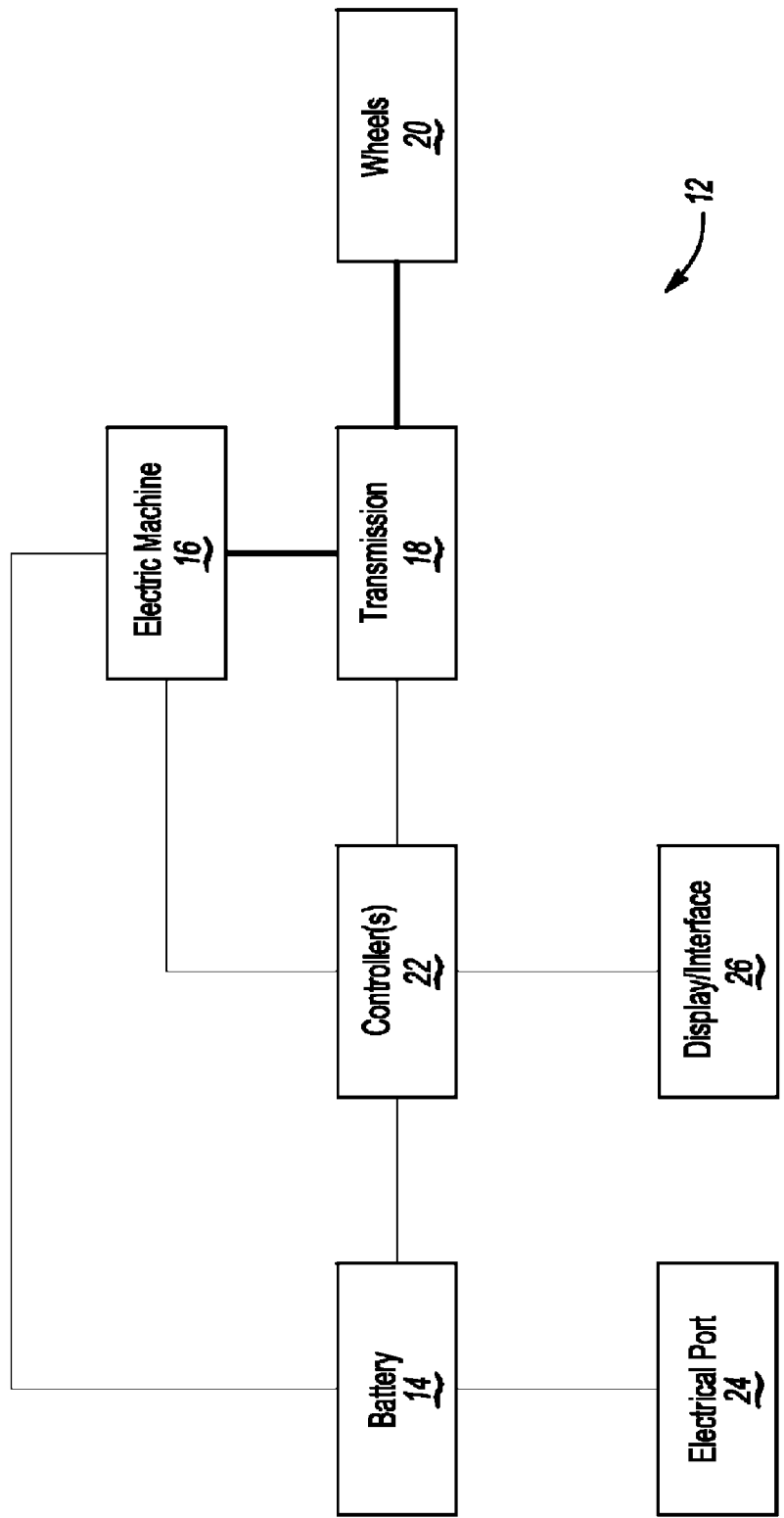
FIG. 1 is a block diagram of an example battery electric vehicle.

Conventional distance to empty (DTE) determinations (used in ICE vehicles for example) use continuously calculated bins of historical DTE, each over a fixed distance, to produce an average DTE. This technique, however, may produce substantial errors during transient battery electric vehicle (BEV) driving events such as transitioning from city to highway driving. Conventional DTE determinations also assume that available energy from remaining fuel is constant, regardless of temperature or age. The energy available from typical BEV batteries, however, depends on temperature and age.

Internal combustion engine (ICE) vehicles are typically only 20 to 35% efficient in converting energy stored in a liquid fuel (e.g., gasoline) to motive torque. The conversion produces a substantial amount of waste heat (from the combustion process). When heat is demanded for cabin heating, this demand has little impact on engine efficiency since the waste heat can be used. Hence, the impact on fuel economy is low.

BEVs may be about 80% efficient (or more) in converting electrical power to motive torque. The conversion produces far less waste heat as compared with ICE vehicles. This waste heat may not be enough to provide sufficient cabin heating. Hence, cabin heating demands may have a greater impact on BEV powertrain efficiency and therefore fuel economy as compared with ICE vehicles. Similarly, cabin cooling demands may have a greater impact on BEV fuel economy as compared with ICE vehicles.

Certain embodiments described herein provide DTE (expected vehicle drive range) determinations for electrically powered vehicles. These determinations may account for changes in available energy due to changes in temperature and age. These determinations may also account for changes in rates of energy consumption due to changing vehicle and environmental conditions. Some embodiments, for instance, may determine DTE based on the remaining energy content of the battery and an energy consumption rate. This energy consumption rate, in certain circumstances, may be an average of a plurality of periodically determined short term energy consumption rates (a long term energy consumption rate). In other circumstances, the energy consumption rate may be a most recently determined short term energy consumption rate, an average of several most recently determined short term energy consumption rates, or a combination of short term and long term energy consumption rates, etc.

The long term energy consumption rate is more likely to be used under steady state conditions (e.g., where each of the periodically calculated short term energy consumption rates falls within some predetermined range of the overall trend). The short term energy consumption rate is more likely to be used under non-steady state conditions (e.g., where some of the periodically calculated short term energy consumption rates fall outside of some predetermined range relative to the overall trend).

As an example, energy consumption rates (e.g., Whrs/mile) may be determined in any suitable/known fashion for every 3 miles traveled (or any other desired/selected distance) by the vehicle. Measured voltage/current flow out of the battery for each 3 miles traveled, for example, may be used to determine the corresponding energy consumption rate. These short term energy consumption rates may be stored, for example, in a sliding window buffer of calibratable size (e.g., 20 entries). That is, when the $21^{st}$ short term energy consumption rate is determined in this example, the $1^{st}$ short term energy consumption rate will be purged from the buffer. A long term energy consumption rate may be determined based on the short term energy consumption rates (e.g., the average/weighted average of the short term energy consumption rates). A subset of the short term consumption rates (e.g., an average of the 5 most recent short term energy consumption rates in the buffer) may be compared to the long term energy consumption rate. If the difference between the average of the subset of short term energy consumption rates and the long term energy consumption rate is greater than some calibratable threshold, the long term energy consumption rate may be updated/modified/replaced by, for example, the average of the subset of short term energy consumption rates. The distance to empty may then be calculated based on the remaining energy in the battery and the determined energy consumption rate. Other scenarios are also possible.

Referring to FIG. 1, an embodiment of a BEV 12 may include a battery 14 and electric machine 16. The BEV 12 may also include a transmission 18, wheels 20, one or more controllers 22, electrical port 24, and display/interface 26 (e.g., screen, speakers, push button, etc.) The electric machine 16 and wheels 20 are mechanically connected with the transmission 18 (as indicated by thick lines) in any suitable/known fashion such that the electric machine 16 may drive the wheels 20, and the wheels 20 may drive the electric machine 16. Other arrangements are also possible. The battery 14 may provide energy to or receive energy from the electric machine 16. The battery 14 may also receive energy from a utility grid or other off-board power source (not shown) via the electrical port 24. The one or more controllers 22 are in communication with and/or control the battery 14, electric machine 16, transmission 18 and display/interface 26 (as indicated by thin line).

Figure 2:
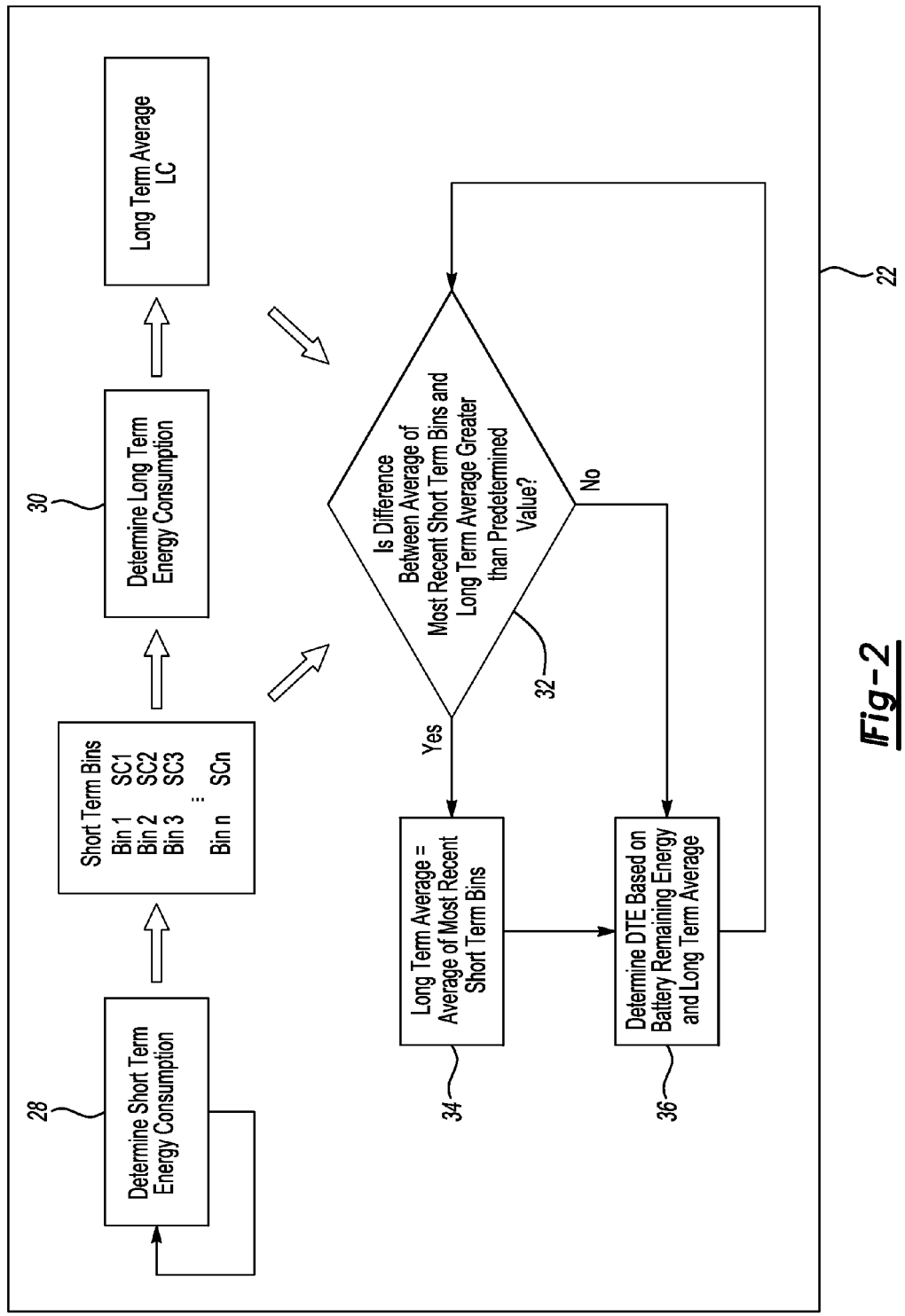
FIG. 2 is a flow chart depicting an example algorithm for determining a distance to empty/expected vehicle drive range for the battery electric vehicle of FIG. 1.

Referring to FIG. 2, short term energy consumption rates may be determined as indicated at operation 28. The one or more controllers 22, for example, may continuously/periodically calculate "Short Term Energy Consumption Rate" (e.g., SC1, SC2, SC3, . . . , SCn) according to the following relation $$SC_i = \text{average energy consumption/fixed distance}$$

where the fixed distance may be set by the manufacturer or selected as desired, and the average energy consumption may be found, for example, by integrating the product of the current and voltage associated with the battery 14 (FIG. 1) over the fixed distance. Certain embodiments may have a fixed number of bins available to store the short term energy consumption rates. Once all the bins have been filled, the oldest rate may be removed as each new rate is determined and stored.

As indicated at operation 30, a long term energy consumption rate may be determined. The one or more controllers 22, for example, may periodically calculate "Long Term Energy Consumption Rate" (e.g., LC) according to the following relation $$LC = \Sigma SC_i / \text{total number of bins}$$

As indicated at operation 32, a difference between an average of the most recent short term bins (e.g., Bin n−5 through Bin n) and the long term average, LC, may be determined. If this difference is greater than or equal to some threshold (e.g., 10%), the algorithm proceeds to operation 34. If this difference is less than the threshold, the algorithm proceeds to operation 36.

Alternatively, the one or more controllers 22 may implement a counter that tracks the number of bins whose stored short term energy consumption rate exceeds the long term average by a threshold amount. If the tracked number is greater than or equal to some threshold number, the algorithm proceeds to operation 34. If the tracked number is less than the threshold number, the algorithm proceeds to operation 36. Other techniques may also be used.

As indicated at operation 34, the long term average, LC, may be set equal to the average of the most recent short term bins determined at operation 32.

Alternatively, the long term average, LC, determined at operation 30 may be blended with (e.g., combined with a weighted average of) certain of the short term energy consumption rates (e.g., the short term energy consumption rates that exceed the long term average by the threshold amount discussed above). Other techniques may also be used.

As indicated at operation 36, the DTE may be determined based on the remaining energy in the battery (FIG. 1) and the long term average, LC. The one or more controllers 22, for example, may calculate the DTE according to the following relation $$DTE = \text{battery remaining energy}/LC$$

where battery remaining energy (BRE) may be found according to the following relation $$BRE = \text{battery usable energy } c*SOC$$

where the battery usable energy depends on the capacity of the battery 14 (for a given battery size, the battery usable energy value may be supplied by the manufacturer of the battery), c is a correction factor that depends on battery age and/or battery temperature, and SOC is the state of charge of the battery 14. The one or more controllers 22, for example, may retrieve the battery usable energy value from memory, and monitor battery age and/or battery temperature, and battery state of charge in any suitable/known fashion.

Referring again to FIG. 1, the DTE determined as described with reference to FIG. 2 may be output to the driver via the display/interface 26.

The algorithms disclosed herein may be deliverable to a processing device, such as the one or more controllers 22, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as application specific integrated circuits (ASICs), field-programmable gate arrays (FPGAs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A vehicle comprising:
an electric machine configured to generate motive power for the vehicle;
a battery configured to store energy for the electric machine; and
one or more controllers configured to
determine a remaining energy of the battery,
determine a series of energy consumption rates for the vehicle,
determine whether at least one of the series of energy consumption rates differs from an average of the series of energy consumption rates by a predetermined amount, and
determine an expected vehicle drive range (i) based on the remaining energy and the at least one of the series of energy consumption rates if the at least one of the series of energy consumption rates differs from the average of the series of energy consumption rates by the predetermined amount and (ii) based on the remaining energy and all of the series of energy consumption rates if the at least one of the series of energy consumption rates does not differ from the average of the series of energy consumption rates by the predetermined amount.

2. The vehicle of claim 1 wherein each of the series of energy consumption rates is determined for a specified distance traveled by the vehicle.

3. The vehicle of claim 1 further comprising a driver interface, wherein the one or more controllers are further configured to cause the expected vehicle drive range to be at least one of displayed or played via the driver interface.

4. A vehicle comprising:
an electric machine configured to generate motive power for the vehicle;
a battery configured to store energy for the electric machine; and
one or more controllers configured to
determine a remaining energy of the battery,
determine a series of energy consumption rates for the vehicle,
determine whether an average of the series of energy consumption rates differs from an average of a subset of the series of energy consumption rates by a predetermined amount,
select a set of energy consumption rates from the series based on whether the average of the series differs from the average of the subset by the predetermined amount, and
determine an expected drive range for the vehicle based on the remaining energy and the selected set of energy consumption rates.

5. The vehicle of claim 4 wherein the selected set of energy consumption rates includes the subset of the series of energy consumption rates if the average of the series differs from the average of the subset by the predetermined amount.

6. The vehicle of claim 4 wherein the selected set of energy consumption rates includes all of the energy consumption rates of the series.

7. The vehicle of claim 4 further comprising a driver interface, wherein the one or more controllers are further configured to cause the expected vehicle drive range to be at least one of displayed or played via the driver interface.

8. A vehicle comprising:
an electric machine configured to generate motive power for the vehicle;
a battery configured to store energy for the electric machine; and
one or more controllers configured to
determine a remaining energy of the battery,
determine a series of energy consumption rates for the vehicle,
determine an average of the series of energy consumption rates,
determine a number of the energy consumption rates of the series that differ from the average by a predetermined amount,
determine whether the number exceeds a predetermined number,
select a set of energy consumption rates from the series based on whether the number exceeds the predetermined number, and
determine an expected drive range for the vehicle based on the remaining energy and the selected set of energy consumption rates.

9. The vehicle of claim 8 wherein the selected set of energy consumption rates includes the energy consumption rates of the series that differ from the average by the predetermined amount if the number exceeds the predetermined number.

10. The vehicle of claim 8 wherein the selected set of energy consumption rates includes all of the energy consumption rates of the series.

11. The vehicle of claim 8 further comprising a driver interface, wherein the one or more controllers are further configured to cause the expected vehicle drive range to be at least one of displayed or played via the driver interface.

* * * * *